(12) United States Patent
Miki (10) Patent No.: US 9,383,191 B2
(45) Date of Patent: Jul. 5, 2016

(54) OUTER DIMENSION MEASURING APPARATUS AND OUTER DIMENSION MEASURING METHOD

(71) Applicant: MITUTOYO CORPORATION, Kanagawa (JP)

(72) Inventor: Yutaka Miki, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/799,987

(22) Filed: Jul. 15, 2015

(65) Prior Publication Data

US 2016/0040980 A1      Feb. 11, 2016

(30) Foreign Application Priority Data

Aug. 5, 2014   (JP) ................................. 2014-159681

(51) Int. Cl.
| | |
|---|---|
| G01B 11/14 | (2006.01) |
| G01J 4/00 | (2006.01) |
| G01N 21/00 | (2006.01) |
| G01B 11/28 | (2006.01) |
| G01B 11/30 | (2006.01) |
| G01B 5/18 | (2006.01) |
| G01G 7/00 | (2006.01) |
| G01B 11/02 | (2006.01) |
| G01B 11/08 | (2006.01) |

(52) U.S. Cl.
CPC ................ G01B 11/02 (2013.01); G01B 11/08 (2013.01); *G01B 2210/50* (2013.01)

(58) Field of Classification Search
CPC ...... G01B 11/02; G01B 11/026; G01B 11/24; G01B 11/0691; G01B 11/0608; G01B 2210/50; G01B 7/023; G01B 7/107; G01J 9/00; G02B 21/0032; G02B 21/0064; G02B 21/0068; G01N 33/346

USPC .................. 356/625, 364, 343, 630, 73, 609; 702/166, 173

See application file for complete search history.

(56) References Cited

U.S. PATENT DOCUMENTS

| | | | | |
|---|---|---|---|---|
| 2004/0262522 | A1* | 12/2004 | Kitahara | G02B 21/0048 250/341.8 |
| 2009/0059244 | A1* | 3/2009 | Hellstrom | G01B 7/023 356/630 |
| 2011/0013186 | A1* | 1/2011 | Miki | G01B 11/026 356/364 |
| 2014/0092295 | A1* | 4/2014 | Lai | G02B 7/38 348/356 |

FOREIGN PATENT DOCUMENTS

| | | |
|---|---|---|
| JP | 2009-137823 | 6/2009 |
| JP | 2010-286244 | 12/2010 |
| JP | 2011-106817 | 6/2011 |

* cited by examiner

*Primary Examiner* — Tarifur Chowdhury
*Assistant Examiner* — Sunghee Y Gray
(74) *Attorney, Agent, or Firm* — Greenblum & Bernstein, P.L.C.

(57) ABSTRACT

An outer dimension measuring apparatus includes a light source; an optical system focusing the light emitted from the light source onto an optical axis; a reflector reflecting the focused light; a detector detecting an intensity of the reflected light; and a calculator calculating an outer dimension of a measured object using a first focus position, a second focus position, and a position of the reflector on the optical axis, the first focus position lying on the optical axis where a peak in reflected light intensity is detected by the detector for light reflected by a first surface, and the second focus position lying on the optical axis where a peak in reflected light intensity is detected by the detector for light that has been reflected by the reflector and emitted at a second surface.

7 Claims, 5 Drawing Sheets

Wavelength

Fig. 6

OUTER DIMENSION MEASURING APPARATUS AND OUTER DIMENSION MEASURING METHOD

CROSS-REFERENCE TO RELATED APPLICATIONS

The present application claims priority under 35 U.S.C. §119 of Japanese Application No. 2014-159681, filed on Aug. 5, 2014, the disclosure of which is expressly incorporated by reference herein in its entirety.

BACKGROUND OF THE INVENTION

1. Field of the Invention

The present invention relates to an outer dimension measuring apparatus and an outer dimension measuring method, and particularly relates to an outer dimension measuring apparatus and an outer dimension measuring method applied to measurement of an outer dimension of a thin wire member.

2. Description of Related Art

A laser scanning micrometer, an image sensor micrometer, an optical slicing two-dimensional shape measuring sensor, and the like are known examples of an apparatus conducting non-contact measurement of an outer dimension of a measured object such as a wire member.

For example, Japanese Patent Laid-open Publication No. 2011-106817 discloses a laser scanning micrometer. The laser scanning micrometer includes a light generator emitting a laser beam; a scanner scanning the laser beam over a measurement area; a photoreceiver receiving the laser beam passing through the measurement area; and a program calculating a dimension of a measured object based on a photoreception signal. In this example, a state where the scanning laser beam is blocked by the measured object is detected by the photoreceiver, an amount of time that the light is blocked is measured, the time is multiplied by speed, and the dimension of the measured object is calculated.

Japanese Patent No. 5507895 discloses an image sensor micrometer. The image sensor micrometer includes a projector emitting slit-shaped parallel light; a photoreceiver element receiving the slit-shaped parallel light passing through a dimension measurement area; a blocked light region detector detecting a blocked light region where light incident on the photoreceiver element is blocked by the measured object; and a dimension calculator calculating a dimension of the measured object based on the blocked light region. In this example, a size of a shadow cast by the measured object is detected by the photoreceiver element (an image sensor such as a CCD).

However, in the conventional outer dimension measuring apparatuses and outer dimension measuring methods, when the measured object is a thin wire member having an outer diameter of less than 10 μm, for example, measuring the outer dimension is difficult. Specifically, in the laser scanning micrometer, the wire member diameter is narrower than the diameter of the scanning laser beam, and only a portion of the laser beam is blocked by the measured object. Therefore, detecting the blocked light state is difficult. In addition, in the image sensor micrometer, detection of the blocked light region is difficult due to a reduction in contrast of the shadow due to diffraction (bending) of the light from the measured object, and due to limits on resolution determined by a pixel size of the image sensor.

The present invention provides an outer dimension measuring apparatus and an outer dimension measuring method capable of measuring an outer dimension of a measured object such as a thin wire member with a high degree of accuracy.

SUMMARY OF THE INVENTION

In order to resolve the above-noted issues, an outer dimension measuring apparatus according to the present invention includes: a light source emitting light; an optical system focusing the light emitted from the light source onto an optical axis; a reflecting portion reflecting the light focused by the optical system; a detection portion detecting an intensity of the reflected light according to a focus position on the optical axis of the light passing through the optical system; and a calculator calculating an outer dimension of a measured object using a first focus position, a second focus position, and a position of the reflecting portion on the optical axis, the first focus position lying on the optical axis where a peak in reflected light intensity is detected by the detection portion for light reflected by a first surface, which is a surface of the measured object closest to the optical system, and the second focus position lying on the optical axis where a peak in reflected light intensity is detected by the detection portion for light that has been reflected by the reflecting portion and fired (i.e., emitted) at a second surface, which is a surface of the measured object closest to the reflecting portion, and reflected by the second surface.

According to this configuration, the respective positions of the first surface and the second surface are detected based on the light reflected by the first surface, which is the surface of the measured object closest to the optical system, and the light reflected by the second surface, which is the surface of the measured object closest to the reflecting portion. Therefore, even when the measured object has an extremely narrow outer diameter, for example, the narrowness of the outer diameter is unlikely to affect measurement. Accordingly, the calculator can calculate the outer dimension of the measured object with a high degree of accuracy based on the first focus position, the second focus position, and the position of the reflecting portion. Furthermore, the light reflected by the first surface and the light reflected by the second surface are detected by the detection portion, and thus the first focus position and the second focus position can be found simultaneously with one measurement.

The outer dimension measuring apparatus according to the present invention may also be configured such that the reflecting portion includes a center region centered on a position where the reflecting portion intersects with the optical axis, and a peripheral region provided around the center region; and such that light reflectance of the center region is lower than the light reflectance of the peripheral region.

According to this configuration, the reflected light intensity of the light that is in focus at the center region provided at the position where the reflecting portion intersects with the optical axis can be reduced, and the light reflected by the first surface and the light reflected by the second surface can be accurately extracted.

The outer dimension measuring apparatus according to the present invention may also be configured such that the optical system has axial chromatic aberration on the optical axis; the detection portion includes a spectroscope scattering into each wavelength the reflected light that has passed through a pinhole provided at a confocal point position of the optical system, and a photoreceiver detecting an intensity of the reflected light scattered by the spectroscope; and the calculator calculates the focus position on the optical axis corresponding to a position of the peak intensity of the reflected light detected by the detection portion. According to this configuration, using the axial chromatic aberration of the optical system, the first focus position and the second focus position can be found based on the focus position for the wavelength of light passing through the pinhole. Furthermore, the wavelength of the light detected by the spectroscope and the photoreceiver is comparatively distant from the light reflected by the first surface and the light reflected by the second surface, and thus the first focus position and the second focus position can be found simultaneously with one measurement.

The outer dimension measuring apparatus according to the present invention may also be configured such that the light emitted from the light source is broadband light. According to this configuration, the outer dimension of the measured object can be measured within a range of wavelengths included in the broadband light.

The outer dimension measuring apparatus according to the present invention may also be configured such that the light source is a white light source. According to this configuration, the outer dimension of the measured object can be measured within a range of wavelengths included in the white light emitted from the white light source.

The outer dimension measuring apparatus according to the present invention may also be configured such that the calculator calculates the outer dimension of the measured object using D=P1−P2−2(P3−P2), where P1 is the first focus position, P2 is the second focus position, P3 is the position of a reflecting surface of the reflecting portion on the optical axis, and D is the outer dimension (for example, outer diameter) of the measured object. According to this configuration, the outer dimension D of the measured object can be calculated with a high degree of accuracy by performing calculation using the calculator.

The outer dimension measuring apparatus according to the present invention may also be configured such that a core portion on an end surface of an optical fiber is regarded as the pinhole and the reflected light is transmitted via the optical fiber. According to this configuration, the core portion on the end surface of the optical fiber is regarded as the pinhole, and the reflected light focused at the core portion, which is the confocal point, can be collected via the optical fiber.

An outer dimension measuring method according to the present invention includes: focusing light emitted from a light source onto an optical axis using an optical system and firing the focused light at a measured object both directly and by reflecting the focused light off a reflecting portion; detecting a first focus position on the optical axis, where a peak in reflected light intensity is formed, for light reflected by a first surface, which is a surface of the measured object closest to the optical system; detecting a second focus position on the optical axis, where a peak in reflected light intensity is formed, for light reflected by a second surface, which is a surface of the measured object closest to the reflecting portion; and calculating an outer dimension of the measured object using the first focus position, the second focus position, and a position of the reflecting portion on the optical axis.

According to this configuration, the respective positions of the first surface and the second surface can be detected based on the light reflected by the first surface, which is the surface of the measured object closest to the optical system, and the light reflected by the second surface, which is the surface of the measured object closest to the reflecting portion, and a measurement beam spot diameter can be kept to several μm or less. Therefore, even in a case where a thin wire member having an outer diameter of 10 μm or less is used as the measured object, unavoidable issues accompanying measurement principles in the conventional technology (difficulty of detecting a light-blocked state or light-blocked region) can be avoided. Accordingly, the outer dimension of the measured object can be found with a high degree of accuracy based on the first focus position, the second focus position, and the position of the reflecting portion. Furthermore, the light reflected by the first surface and the light reflected by the second surface are detected, and thus the first focus position and the second focus position can be found simultaneously with one measurement.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. In the following description, portions identical to those which have been previously described are assigned identical reference numerals and a description thereof is omitted where appropriate.

First Embodiment

Figure 1:
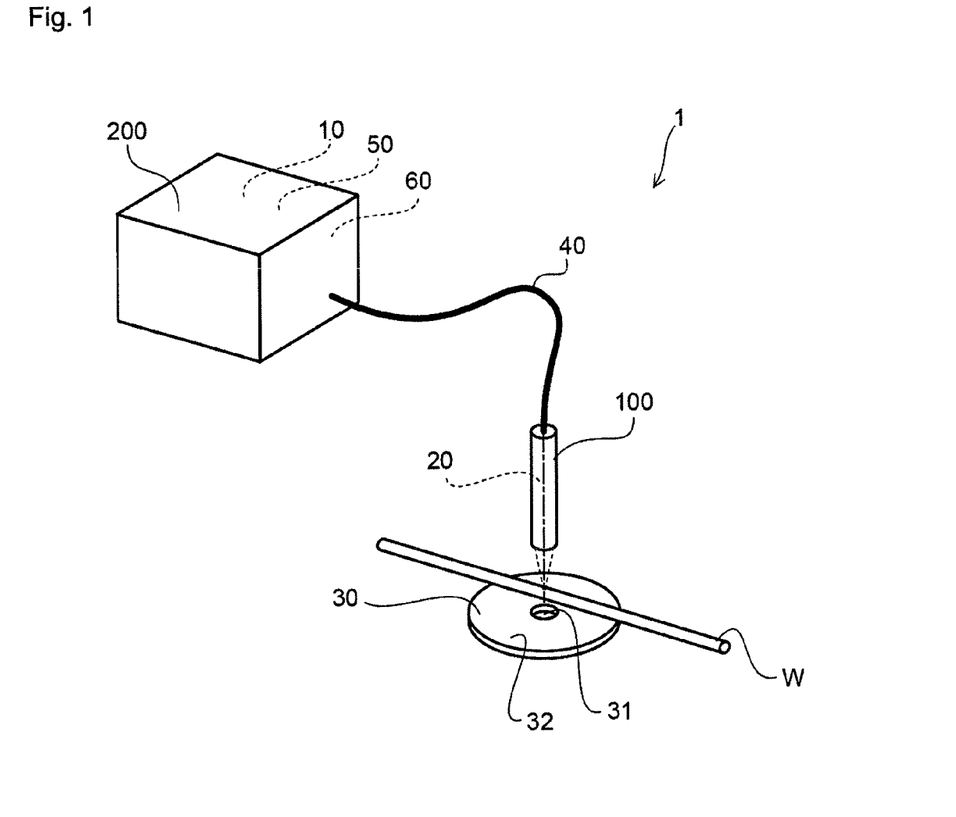
FIG. 1 is a schematic view illustrating an exemplary outer dimension measuring apparatus according to a first embodiment.

FIG. 1 is a schematic view illustrating an exemplary outer dimension measuring apparatus according to a first embodiment. As shown in FIG. 1, an outer dimension measuring apparatus 1 according to the present embodiment includes a sensor head 100 and a console 200, and conducts optical, non-contact measurement of an outer dimension of a work piece W to be measured.

The sensor head 100 and the console 200 are connected by an optical fiber 40. The outer dimension measuring apparatus 1 measures the outer dimension of the work piece W using reflected light of light emitted from the sensor head 100. In the present embodiment, the work piece W is formed by a material that reflects the light emitted from the sensor head 100. The work piece W is, for example, a wire member (such as a wire).

A mirror 30 (a reflecting portion or reflector) is provided below the work piece W (on an opposite side of the work piece W from the sensor head 100). The mirror 30 is a planar mirror. The mirror 30 includes a center region 31 and a peripheral region 32. The center region 31 has a predetermined range centered on a position where an optical axis of an optical system 20 intersects with the mirror 30. The center region 31 is a circular region, for example.

The peripheral region 32 is a region provided around the center region 31. Light reflectance of the center region 31 is lower than that of the peripheral region 32. In the present embodiment, the center region 31 is a hole region provided in the mirror 30. The peripheral region 32 is a region of the mirror 30 other than the hole. With this configuration, even when the work piece W is configured by a thin wire member, an outer diameter (outer dimension) is measured with a high degree of accuracy.

The center region 31 is not necessarily configured by a hole. For example, a color (such as black) inhibiting reflection of light may be provided at the center region 31, or microscopic unevenness may be provided which causes light to scatter.

Figure 2A:
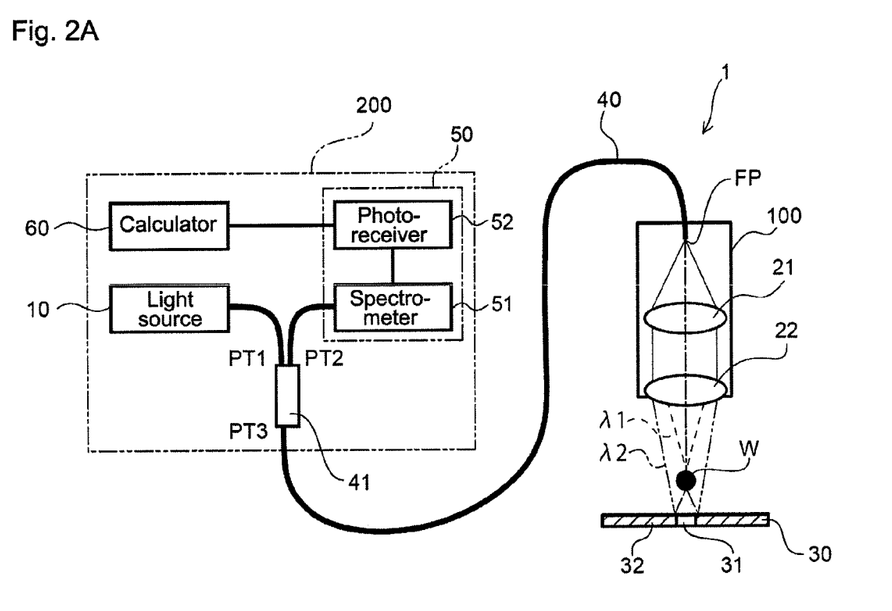
FIG. 2A is a block diagram illustrating an exemplary configuration of the outer dimension measuring apparatus according to the first embodiment.

FIG. 2A is a block diagram illustrating an exemplary configuration of the outer dimension measuring apparatus according to the first embodiment. As shown in FIG. 2A, a light source 10, a detection portion (detector) 50 (a spectroscope 51 and photoreceiver 52), and a calculator 60 are provided to the console 200. The console 200 further includes a fiber coupler 41.

The light fired from the light source 10 is broadband light. A white light source (white LED or the like) may be used, for example, as the light source 10. The light fired from the light source 10 is transmitted to the sensor head 100 via the fiber coupler 41 and the optical fiber 40.

An optical system 20 is embedded in the sensor head 100. The optical system 20 focuses the light fired from the light source 10 onto the optical axis. The optical system 20 includes a collimating lens 20 and a field lens 22.

The collimating lens 21 converts light fired from the light source 10 and emitted through the optical fiber 40 into parallel light. The collimating lens 21 is a lens having little axial chromatic aberration. With the collimating lens 21 having little axial chromatic aberration, parallel light following the optical axis from the field lens 22 toward the collimating lens 21 is focused onto a single point on the optical axis (confocal point FP) regardless of wavelength. Moreover, the collimating lens 21 may be provided when necessary. In a case where the collimating lens 21 is not included, the light emitted from the optical fiber 40 may directly strike the field lens 22 unchanged.

The field lens 22 is positioned closer to the work piece W than the collimating lens 21, i.e., toward a forefront end of the sensor head 100. The field lens 22 is a lens having significant axial chromatic aberration. The field lens 22 focuses the light that was made parallel by the collimating lens 21 onto the work piece W-side optical axis.

When the parallel light incident on the field lens 22 from the collimating lens 21 passes through the field lens 22, which has significant axial chromatic aberration, focal points resolve at different positions on the optical axis depending on the wavelength of the light. In other words, a focal length on the optical axis of the light passing through the field lens 22 differs depending on the wavelength of the light. Using the field lens 22, the shorter the wavelength, the shorter the focal length becomes and the longer the wavelength, the longer the focal length becomes. For example, blue light, green light, and red light have increasing focal lengths in that order.

The mirror 30 is positioned on an opposite side of the work piece W from the field lens 22. The light reflected by the mirror 30 is fired at the surface of the work piece W closest to the mirror 30. In the present embodiment, light from an area outside the work piece W reflected by the surface of the peripheral region 32 of the mirror 30 is fired at the surface of the work piece W closest to the mirror 30.

Of the light fired at the work piece W, light belonging to a wavelength component which is in focus on a surface of the work piece W closest to the field lens 22 (first surface) is reflected by the first surface of the work piece W and is focused at the confocal point FP by the collimating lens 21 via the field lens 22. Furthermore, light belonging to a wavelength component which is in focus on a surface of the work piece W closest to the mirror 30 (second surface) is once again reflected by the mirror 30 and is focused at the confocal point FP by the collimating lens 21 via the field lens 22. Meanwhile, light belonging to a majority of wavelength components, which are not in focus at either of the first surface or the second surface of the work piece W, is not focused at the confocal point FP and dissipates.

The optical fiber 40 is provided between the sensor head 100 and the console 200. An end surface on the sensor head 100 side of the optical fiber 40 is positioned at the confocal point FP. A core portion (core) of the end surface of the optical fiber 40 can be considered a pinhole positioned at the confocal point FP. The optical fiber 40 receives the reflected light that has passed through the pinhole positioned at the confocal point FP and transmits the reflected light toward the console 200.

An end surface on the console 200 side of the optical fiber 40 is connected to the fiber coupler 41. The optical fiber 40 transmits the light fired from the light source 10 to the sensor head 100 and emits the light toward the collimating lens 21. Meanwhile, the optical fiber 40 receives the light that is reflected by the work piece W and the mirror 30 at the confocal point FP and transmits that light to the console 200.

The fiber coupler 41 of the console 200 includes at least two ports on a first side and at least one port on a second side. The light source 10 is connected to a first port PT1, which is one of the ports on the first side of the fiber coupler 41, and the spectroscope 51 of the detection portion 50 is connected to a second port PT2, which is the other one of the ports on the first side. The optical fiber 40 is connected to a third port PT3, which is a port on the second side.

The detection portion 50 includes the spectroscope 51 and the photoreceiver 52. The spectroscope 51 scatters incident light according to the wavelength thereof. Diffraction gating, for example, may be used as the spectroscope 51. The photoreceiver 52 detects an intensity of each wavelength of the reflected light focused at the confocal point FP based on the light transmitted by the optical fiber 40. The photoreceiver 52 includes, for example, an image sensor. The light scattered by the spectroscope 51 according to wavelength is detected by the photoreceiver 52; thereby, the intensity of each wavelength of the reflected light focused at the confocal point FP can be detected based on a position detected by the photoreceiver 52.

Based on the intensity of each wavelength of the reflected light detected by the photoreceiver 52, a calculator 60 calculates a height corresponding to a wavelength at which a peak in reflected light intensity occurs. In the present embodiment, the outer dimension of the work piece W is calculated using a process described hereafter.

The outer dimension measuring apparatus 1 according to the present embodiment having this configuration obtains the outer dimension of the work piece W with a high degree of accuracy using measurement principles of a chromatic confocal-type displacement gauge and a calculation process of the calculator 60.

Here, the measurement principles of the chromatic confocal-type displacement gauge are described. First, light is emitted from the light source 10 and is fired from the field lens 22 of the sensor head 100 toward a measured object. The fired light is in focus at different positions depending on wavelength, due to the axial chromatic aberration of the field lens 22. Of the light reflected by the measured object, light at a wavelength that is not in focus at the front surface of the measured object is not focused at the confocal point FP and only a small amount is collected by the optical fiber 40. Meanwhile, of the light reflected by the measured object, light at a wavelength that is in focus at the front surface of the measured object is focused at the confocal point FP and a majority of the light is transmitted to the spectroscope 51 via the optical fiber 40. Accordingly, in the light collected by the optical fiber 40, the wavelength component that is in focus at the front surface of the measured object has a high intensity, whereas the intensity of other components is weaker.

The light focused at the confocal point FP and transmitted by the optical fiber 40 is delivered to the spectroscope 51. The light delivered to the spectroscope 51 is scattered according to wavelength and reaches the photoreceiver 52. At the photoreceiver 52, received light intensity is detected for each position of light scattered by the spectroscope 51. A detection position of the light in the photoreceiver 52 is set for each wavelength. Therefore, in a case where a peak in received light intensity occurs at a specific detection position, the wavelength corresponding to that detection position can be found. The calculator 60 finds a position (height) of the front surface (reflection surface) of the measured object based on the focal length of the field lens 22 at the wavelength in which the peak occurred.

In the outer dimension measuring apparatus 1 according to the present embodiment, the light emitted from the light source 10 is fired at the work piece W from the field lens 22, and both the light reflected by the first surface of the work piece W, which is the surface closest to the optical system 20, and the light reflected by the mirror 30 and off the second surface of the work piece W, which is the surface closest to the mirror 30, are received at the confocal point FP and transmitted by the optical fiber 40. In addition, the outer dimension of the work piece W is found by performing calculation with the calculator 60 using a position on the optical axis where a peak in reflected light intensity is detected by the photoreceiver 52 for the light reflected by the first surface (first focus position), a position on the optical axis where a peak in reflected light intensity is detected by the photoreceiver 52 for the light reflected by the second surface (second focus position), and a position on the optical axis of the mirror 30.

Figure 2B:
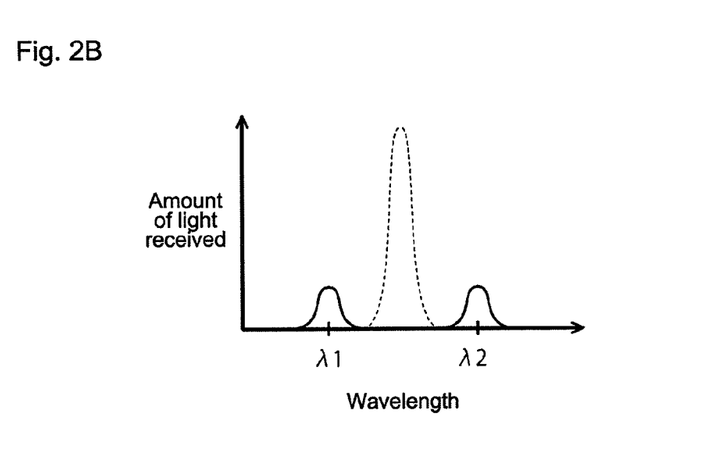
FIG. 2B illustrates an exemplary wavelength distribution of light received by an optical fiber at a confocal point.

Next, the principles of measuring the outer dimension using the outer dimension measuring apparatus 1 according to the present embodiment are described. FIG. 2B illustrates an exemplary wavelength distribution of light received by the optical fiber 40 at the confocal point FP. In the outer dimension measuring apparatus 1 according to the present embodiment, of the light fired through the field lens 22 directly at the work piece W, wavelength $\lambda 1$ light having a focal point on the first surface of the work piece W is reflected and is collected by the optical fiber 40 through the confocal point FP. In addition, of the light fired through the field lens 22 in a direction of the work piece W and reflected by the mirror 30, wavelength $\lambda 2$ light having a focal point on the second surface of the work piece W is reflected by the second surface, is further reflected by the mirror 30, and is collected by the optical fiber 40 through the confocal point FP.

In this way, the light of wavelength $\lambda 1$ and the light of wavelength $\lambda 2$ are focused at the confocal point FP and are collected by the optical fiber 40. Accordingly, a wavelength distribution of the light collected and transmitted by the optical fiber 40 includes two peaks for the wavelength $\lambda 1$ and the wavelength $\lambda 2$.

Herein, a hole is provided to the center region 31, which is centered on a position where the mirror 30 intersects with the optical axis. Therefore, light of a wavelength that is fired through the field lens 22 in the direction of the work piece W and that has a focal point at the intersection position of the mirror 30 and the optical axis is not reflected by the mirror 30. Accordingly, light which reaches the confocal point FP without being reflected by the mirror 30 and striking the work piece W will not appear in the wavelength distribution of light collected by the optical fiber 40.

When there is light reflected by the mirror 30 that reaches the confocal point FP without striking the work piece W, the light appears as an extremely large peak, as shown by a dashed line in FIG. 2B, because optical reflectance of the mirror 30 is high. In the present embodiment, a hole is provided to the center region 31 of the mirror 30 to reduce the reflectance to less than that of the peripheral region 32. Therefore, light belonging to a wavelength component having a large peak of this kind does not appear and the light of the two peaks at the wavelength $\lambda 1$ and the wavelength $\lambda 2$ can be accurately detected.

Figure 3:
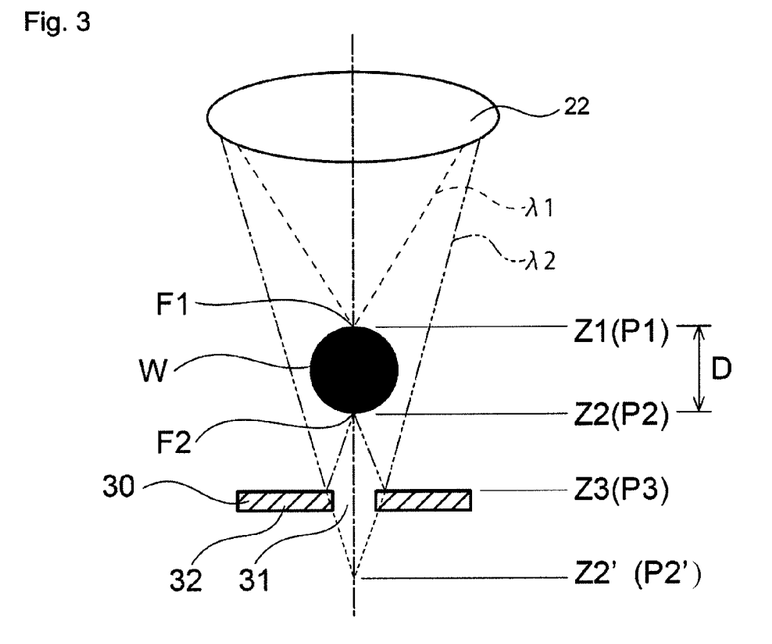
FIG. 3 is a schematic view illustrating exemplary detection positions of a work piece (measured object) and a mirror.

The calculator 60 calculates the outer dimension of the work piece W using the position of the mirror 30 and a position detected based on the light of the two peaks at the wavelength $\lambda 1$ and the wavelength $\lambda 2$. FIG. 3 illustrates detection positions of the work piece W and the mirror 30. When light is fired in a state where the work piece W is positioned between the field lens 22 and the mirror 30, the light strikes the surface of the work piece W closest to the field lens 22 (first surface F1). Of this light, the light of wavelength $\lambda 1$ having a focal point at the first surface F1 is detected by the photoreceiver 52, and the calculator 60 finds a first focus position P1 corresponding to the wavelength $\lambda 1$ based on the position detected by the photoreceiver 52.

In addition, the light fired through the field lens 22 and reflected by the mirror 30 strikes the surface of the work piece W closest to the mirror 30 (second surface F2). Of this light, the light of wavelength $\lambda 2$ having a focal point at the second surface F2 is detected by the photoreceiver 52, and the calculator 60 finds a second focus position P2 corresponding to the wavelength $\lambda 2$ based on the position detected by the photoreceiver 52.

Herein, the first focus position P1 found by the calculator 60 is the same as an actual height-direction position Z1 of the first surface F1 of the work piece W. In addition, a position P3 of the front surface of the mirror 30 found by the calculator 60 is the same as an actual height-direction position Z3 of the front surface of the mirror 30.

Based on this relationship, it is understood that a height-direction coordinate position Z2' relative to the second focus position P2 found by the calculator 60 differs from an actual height-direction position Z2 of the second surface F2 of the work piece W, and this difference is double a distance between the position P3 of the front surface of the mirror 30 and the second focus position P2 (i.e., the coordinate position Z2') found by the calculator 60. Specifically, because the second focus position P2 found by the calculator 60 is a position found using light that has been reflected by the mirror 30 and struck the second surface F2, in a scenario which assumes that the light was not reflected by the mirror 30, the second focus position P2 is the same as the position Z2', which is more distant than the mirror 30 and is where the light of wavelength $\lambda 2$ is in focus on the optical axis. In other words, a value of the second focus position P2 found by the calculator 60 effectively gives the position Z2'.

Based on this relationship, it is understood that a difference between the actual height-direction position Z2 of the second surface F2 of the work piece W and the second focus position P2 (i.e., the position Z2') found by the calculator 60 is double a distance between the position P3 of the front surface of the mirror 30 and the second focus position P2 (i.e., the position Z2') found by the calculator 60.

In the present embodiment, the calculator 60 finds the outer dimension D of the work piece W with the following calculation (1), using the first focus position P1 and second focus position P2 found by calculation and the position P3 of the front surface of the mirror 30, which is found ahead of time.

$$D = P1 - P2 - 2(P3 - P2) \quad (1)$$

Using this calculation, the outer dimension D of the work piece W can be found with a high degree of accuracy based on the light reflected by the first surface F1 and the second surface F2 of the work piece W.

In the outer dimension measuring apparatus 1 according to the present embodiment, the outer dimension D of the work piece W can be found using the light reflected by the first surface F1 and the second surface F2 of the work piece W, and a measurement beam spot diameter of the outer dimension measuring apparatus 1 can be kept to several $\lambda$m or less. Therefore, even in a case where a thin wire member having an outer diameter of 10 μm or less is used as the work piece W, unavoidable issues accompanying measurement principles in the conventional technology (difficulty of detecting a light-blocked state or light-blocked region) can be avoided and the outer diameter of the work piece W can be found with a high degree of accuracy.

In addition, by firing light at the work piece W, reflected light of wavelength $\lambda 1$, which is in focus at the first surface F1, and reflected light of wavelength $\lambda 2$, which is in focus at the second surface F2, can be collected simultaneously. Accordingly, the calculator 60 can calculate the first focus position P1 and the second focus position P2 based on a peak in received light intensity for wavelength $\lambda 1$ and a peak in received light intensity for wavelength $\lambda 2$ using a single optical firing.

In addition, in the outer dimension measuring apparatus 1 according to the present embodiment, there is no need to scan light using a polygonal mirror or the like, or to provide a photoreceiver having a broad photoreceiving area covering a light scanning range. In other words, using a compact sensor head 100 and a simple mirror 30, configuration of the apparatus can be simplified and the apparatus can be reduced in size.

Figure 4:
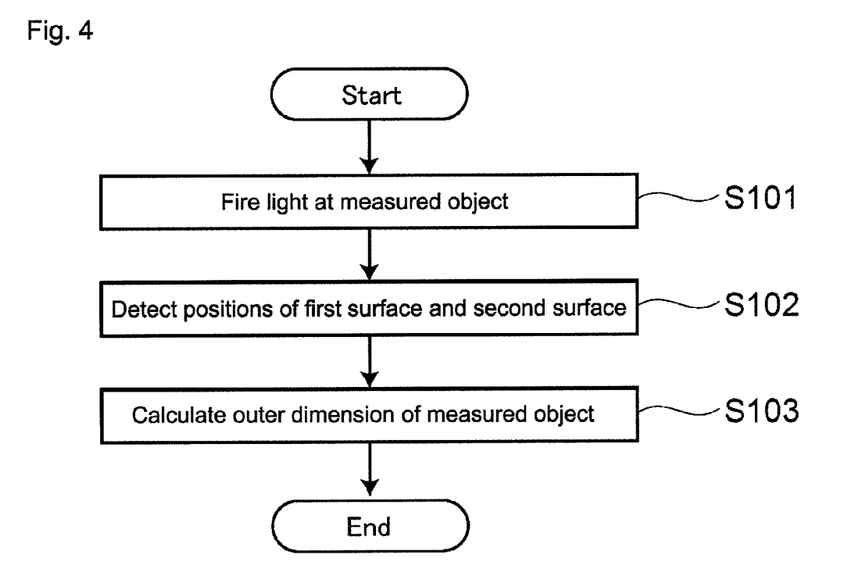
FIG. 4 is a flow chart illustrating an exemplary flow of an outer dimension measuring method.

An outer dimension measuring method is now described. In the description that follows, an outer dimension measuring method utilizing the outer dimension measuring apparatus 1 according to the present embodiment is given as an example. FIG. 4 is a flow chart illustrating an exemplary flow of the outer dimension measuring method. First, as shown in step S101, light is emitted from the light source 10 and is fired from the field lens 22 of the sensor head 100 toward a measured object. The light fired toward the work piece W is fired at the first surface F1 of the work piece W and is reflected by the mirror 30 to fire at the second surface F2 of the work piece W, as well.

Of the light fired at the work piece W, reflected light of light of a wavelength that is in focus at the first surface F1 and of a wavelength that is in focus at the second surface F2 is collected by the optical fiber 40 through the confocal point FP.

Next, as shown in step S102, a position of the first surface F1 and a position of the second surface F2 are detected. Specifically, the photoreceiver 52 of the detection portion 50 receives the light reflected by the first surface F1 and the light reflected by the second surface F2, which are focused at the confocal point FP, and detects a position of peak light intensity at wavelength $\lambda 1$ and wavelength $\lambda 2$. Then, the first focus position P1 on the optical axis based on the wavelength $\lambda 1$ is calculated by the calculator 60, the second focus position P2 on the optical axis based on the wavelength $\lambda 2$ is likewise calculated by the calculator 60.

Next, as shown in step S103, the outer dimension D of the work piece W to be measured is calculated. The calculator 60 finds the outer dimension D of the work piece W with the above-noted calculation (1), using the position P3 of the mirror 30, which is found ahead of time, and the first focus position P1 and second focus position P2, which were found earlier.

Thereby, the outer dimension D of the work piece W can be found using the measurement principles of the chromatic confocal-type displacement gauge.

Second Embodiment

Figure 5A:
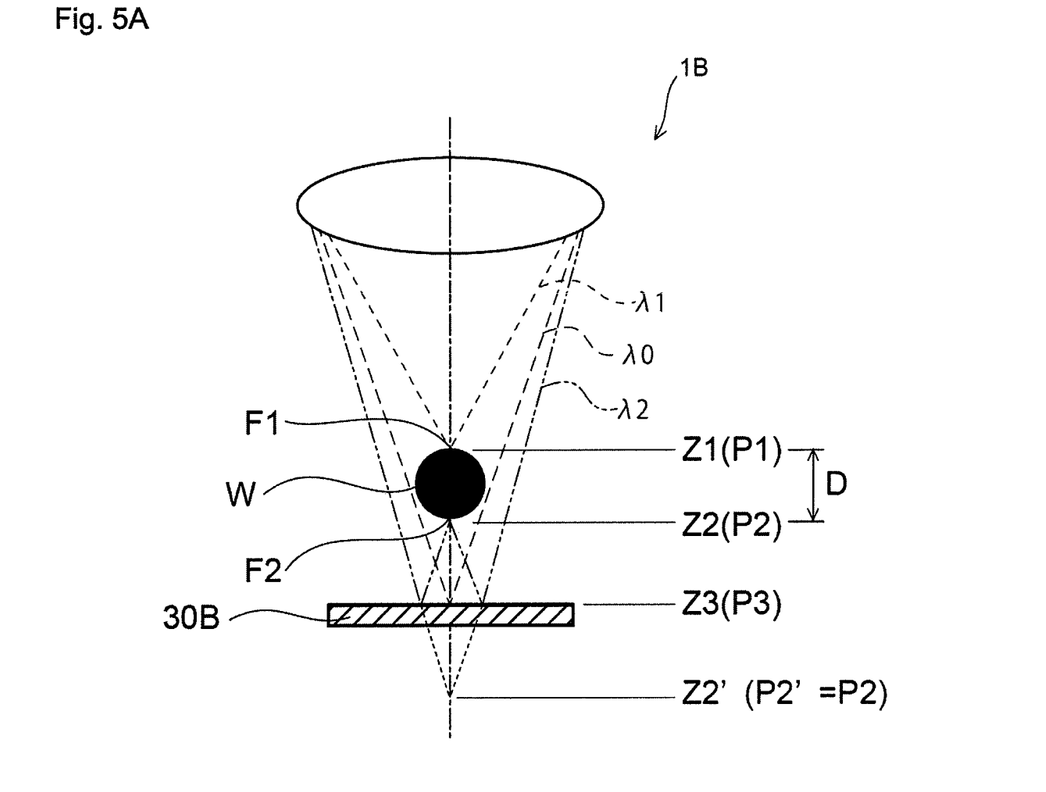
FIG. 5A is a schematic view illustrating an exemplary outer dimension measuring apparatus according to a second embodiment.

Next, a second embodiment is described. FIG. 5A is a schematic view illustrating an exemplary outer dimension measuring apparatus 1B according to a second embodiment. Moreover, FIG. 5A shows a configuration between the field lens 22 and a mirror 30B. In the outer dimension measuring apparatus 1B according to the present embodiment, a hole is not provided to a center region of the mirror 30B. Other configurations are similar to those of the outer dimension measuring apparatus 1 according to the first embodiment.

A reflection surface of the mirror 30B has a uniform reflectance. Therefore, light of a wavelength $\lambda 0$, which is included in the light fired through the field lens 22 toward the work piece W and is in focus at a front surface of the mirror 30B (reflecting surface), also arrives from an area outside the work piece W. The light of the wavelength that is in focus at the front surface of the mirror 30B is collected into the console 200 through the field lens 22 as intense reflected light.

Figure 5B:
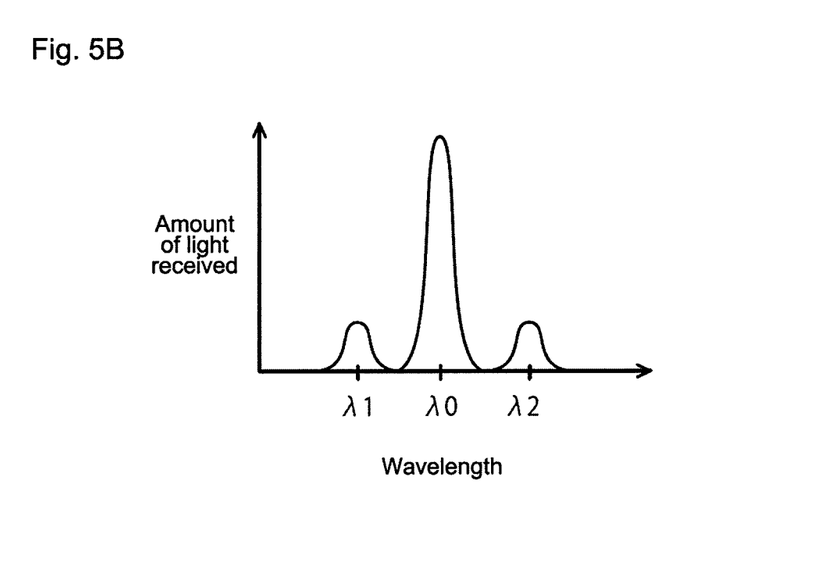
FIG. 5B illustrates an exemplary wavelength distribution of light received by an optical fiber at a confocal point.

FIG. 5B illustrates an exemplary wavelength distribution of light received by the optical fiber 40 at the confocal point FP. In the present embodiment, in addition to the reflected light of wavelength $\lambda 1$, which is focused at and reflected by the first surface F1 of the work piece W, and the reflected light of wavelength $\lambda 2$, which is focused at and reflected by the second surface F2 of the work piece W, reflected light of wavelength $\lambda 0$, which is focused at and reflected by the front surface of the mirror 30B, is also collected by the optical fiber 40 through the confocal point FP.

In the calculator 60 of the outer dimension measuring apparatus 1B according to the present embodiment, a process is performed in which photoreception signals in a predetermined range centered on the wavelength $\lambda 0$, which are included in the peaks in reflected light intensity detected by the detection portion 50, are excluded from calculation of the outer dimension D. In other words, photoreception signals in a predetermined range centered on the wavelength λ0 are excluded by signal processing, and the first focus position P1 and the second focus position P2 are calculated using the photoreception signals of the wavelengths λ1 and λ2, respectively. Thereby, the outer dimension D of the work piece W is found through calculation using the above-noted calculation (1).

Moreover, the calculator 60 may also find the first focus position P1 and the second focus position P2 based on the photoreception signals of the wavelengths λ1 and λ2, respectively, during measurement, and also find the position P3 of the front surface of the mirror 30B using the photoreception signal of the wavelength λ0. The position P3 of the front surface of the mirror 30B, which is found together with the first focus position P1 and the second focus position P2, may be used during calculation of the outer dimension D of the work piece W. Accordingly, there is no need to find the position P3 of the front surface of the mirror 30B ahead of time and errors due to changes in the position of the mirror 30B over time can be eliminated.

Figure 6:
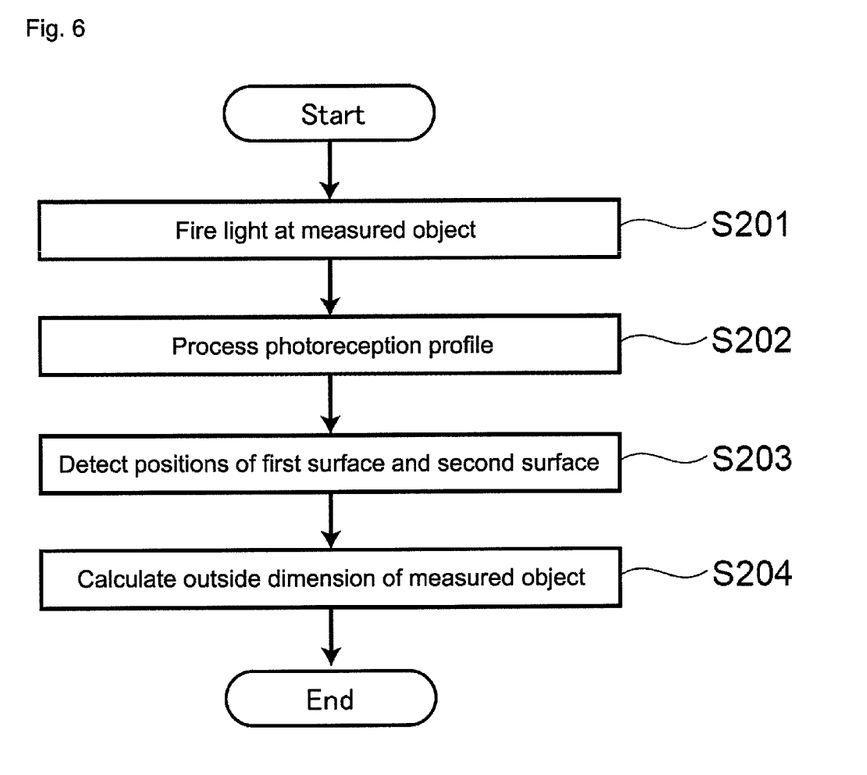
FIG. 6 is a flow chart illustrating an exemplary flow of an outer dimension measuring method.

Next, the outer dimension measuring method using the outer dimension measuring apparatus 1B according to the present embodiment is described. FIG. 6 is a flow chart illustrating an exemplary flow of the outer dimension measuring method. First, as shown in step S201, light is emitted from the light source 10 and is fired from the field lens 22 of the sensor head 100 toward the work piece W to be measured. The light fired toward the work piece W is fired at the first surface F1 of the work piece W and is reflected by the mirror 30B to fire at the second surface F2 of the work piece W, as well.

Of the light fired at the work piece W, reflected light of light of a wavelength that is in focus at the first surface F1 and of a wavelength that is in focus at the second surface F2 is collected by the optical fiber 40 through the confocal point FP. Reflected light of light of a wavelength that is in focus at the front surface of the mirror 30B is also collected by the optical fiber 40 through the confocal point FP.

Next, as shown in step S202, processing is conducted on a reflected light photoreception profile. In the processing of the photoreception profile, processing is performed so as to exclude a photoreception profile of a predetermined range centered on the wavelength λ0 of reflected light that is focused at the front surface of the mirror 30B, and to retain a photoreception profile of the reflected light of wavelength 1, which is focused at the first surface F1, and a photoreception profile of the reflected light of wavelength λ2, which is focused at the second surface F2.

An example of the photoreception profile processing follows.

Signal Processing

In the signal processing, first, in a state where the work piece W is not in position, a photoreception profile of reflected light that is focused at the front surface of the mirror 30 is registered ahead of time. Then, when the outer dimension D is measured, a calculation is performed to subtract the pre-registered photoreception profile from the photoreception profile obtained through measurement. The signal processing is performed by the calculator 60.

Processing with Optical Filter

In processing with an optical filter, using a band elimination filter, for example, a process is performed in which the light of a wavelength of reflected light that is focused at the front surface of the mirror 30B is eliminated and other wavelengths of light are allowed to pass.

Masking

In a masking process, masking (light shielding) is applied to portions of a photoreceiving surface of an image sensor contained in the detection portion 50. Specifically, the masking is applied ahead of time to a photoreception position (photoreception region) of the image sensor corresponding to the wavelength of light that is in focus at the front surface of the mirror 30B. Accordingly, a signal for the position (region) corresponding to the wavelength of light that is in focus at the front surface of the mirror 30B is excluded from a photoreception signal output from the detection portion 50 to the calculator 60.

Next, as shown in step S203, a position of the first surface F1 and a position of the second surface F2 are detected. Specifically, based on the position of the peak in reflected light intensity detected by the detection portion 50, the first focus position P1 and the second focus position P2 on the optical axis based on the wavelength λ1 are calculated by the calculator 60.

Next, as shown in step S204, the outer dimension D of the work piece W to be measured is calculated. The calculator 60 finds the outer dimension D of the work piece W with the above-noted calculation (1), using the position P3 of the mirror 30B, which is found ahead of time, and the first focus position P1 and second focus position P2, which were found earlier.

In the outer dimension measuring apparatus 1B and outer dimension measuring method according to the present embodiment, the outer dimension D of the work piece W can be measured without the need to provide a hole to the center region of the mirror 30B.

As described above, the embodiments are capable of providing the outer dimension measuring apparatuses 1 and 1B and the outer dimension measuring methods capable of measuring an outer dimension of a measured object such as a thin wire member with a high degree of accuracy.

Embodiments of the invention are described above. However, the present invention is not limited to these examples. The configuration of the present invention can also be applied to a displacement gauge measuring a position (height) of a measured object using a focal point position of light, for example, a laser confocal point displacement gauge, a focal point displacement gauge, or the like in which a single wavelength of light is fired from the light source 10 and the focal point position is changed by oscillating the field lens 22 in an optical axis direction with a tuning fork or the like. In addition, examples have been described in which the optical fiber 40 is provided between the sensor head 100 and the console 200; however, a configuration is also possible in which light is transmitted without the use of the optical fiber 40. With respect to the above-described embodiments, a person skilled in the art can perform addition, deletion, and design modification of configuration elements as appropriate, and can combine features of the embodiment as appropriate, and such modifications are also included in the scope of the present invention as long as they fall within the subject matter of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An outer dimension measuring apparatus comprising:
    a light source configured to emit light;
    an optical system configured to focus the light emitted from the light source onto an optical axis;
    a reflector configured to reflect the light focused by the optical system, the reflector comprising:
        a center region centered on a position where the reflector intersects with the optical axis; and
        a peripheral region provided around the center region, wherein light reflectance of the center region is lower than light reflectance of the peripheral region;
    a detector configured to detect an intensity of the reflected light according to a focus position on the optical axis of the light passing through the optical system; and
    a calculator configured to calculate an outer dimension of a measured object using a first focus position, a second focus position, and a position of the reflector on the optical axis, the first focus position lying on the optical axis where a peak in reflected light intensity is detected by the detector for light reflected by a first surface, which is a surface of the measured object closest to the optical system, and the second focus position lying on the optical axis where a peak in reflected light intensity is detected by the detector for light that has been reflected by the reflector and emitted at a second surface, which is a surface of the measured object closest to the reflector, and reflected by the second surface.

2. The outer dimension measuring apparatus according to one of claim 1, wherein:
    the optical system has axial chromatic aberration on the optical axis;
    the detector comprises:
        a spectroscope configured to scatter into each wavelength the reflected light that has passed through a pinhole provided at a confocal point position of the optical system; and
        a photoreceiver configured to detect an intensity of the reflected light scattered by the spectroscope, and
    the calculator is further configured to calculate a focus position on the optical axis corresponding to an optical wavelength of a peak intensity of a reflected light detected by the detector.

3. The outer dimension measuring apparatus according to claim 2, wherein the light emitted from the light source is broadband light.

4. The outer dimension measuring apparatus according to claim 2, wherein the light source is a white light source.

5. The outer dimension measuring apparatus according to claim 2, wherein a core on an end surface of an optical fiber is the pinhole, and the reflected light is transmitted via the optical fiber.

6. The outer dimension measuring apparatus according to claim 1, wherein the calculator is further configured to calculate the outer dimension of the measured object using:

$$D=P1-P2-2(P3-P2)$$

where P1 is the first focus position, P2 is the second focus position, P3 is the position of a reflecting surface of the reflector on the optical axis, and D is the outer dimension of the measured object.

7. An outer dimension measuring method comprising:
    focusing light emitted from a light source onto an optical axis using an optical system and emitting the focused light at a measured object both directly and by reflecting the focused light off a reflector, the reflector comprising:
        a center region centered on a position where the reflector intersects with the optical axis; and
        a peripheral region provided around the center region, wherein light reflectance of the center region is lower than light reflectance of the peripheral region;
    detecting a first focus position on the optical axis, where a peak in reflected light intensity is formed, for light reflected by a first surface, which is a surface of the measured object closest to the optical system;
    detecting a second focus position on the optical axis, where a peak in reflected light intensity is formed, for light reflected by the reflector and emitted at a second surface, which is a surface of the measured object closest to the reflector, and reflected by the second surface; and
    calculating an outer dimension of the measured object using the first focus position, the second focus position, and a position of the reflector on the optical axis.

* * * * *